United States Patent [19]

Schauder

[11] Patent Number: 4,707,651
[45] Date of Patent: Nov. 17, 1987

[54] VOLTAGE-CONTROLLED FIELD-ORIENTED INDUCTION MOTOR CONTROL SYSTEM

[75] Inventor: Colin D. Schauder, Murrysville Boro, Pa.

[73] Assignee: Westinghouse Electric Corp., Pittsburgh, Pa.

[21] Appl. No.: 888,907

[22] Filed: Jul. 22, 1986

[51] Int. Cl.[4] .............................................. H02P 5/40
[52] U.S. Cl. .................................... 318/800; 318/807
[58] Field of Search ............... 318/800, 803, 807–811; 324/158 MG

[56] References Cited

U.S. PATENT DOCUMENTS 4,456,868  6/1984  Yamamura et al. ................ 318/806
4,509,003  4/1985  Osnishi et al. ..................... 318/800

OTHER PUBLICATIONS

Levi, E., *Polyphase Motors, A Direct Approach to Their Design*, John Wiley and Sons, 1984, pp. 119–126.

*Primary Examiner*—David Smith, Jr.
*Attorney, Agent, or Firm*—C. M. Lorin

[57] ABSTRACT

An induction motor drive control system is controlled according to a torque demand and a rotor flux amplitude demand while using only a shaft position feedback and providing an open loop equivalent of a vector voltage control approach to the control of the induction motor.

4 Claims, 3 Drawing Figures

VOLTAGE-CONTROLLED FIELD-ORIENTED INDUCTION MOTOR CONTROL SYSTEM

CROSS-REFERENCE TO RELATED APPLICATION

This application is related to copending patent application Ser. No. 888,911 (W.E. 51,913), filed concurrently and entitled A VECTOR UFC CONTROL SCHEME. This copending application is hereby incorporated by reference.

BACKGROUND OF THE INVENTION

The present invention relates to torque control for an induction motor in general, and more particularly to induction motor torque control system involving field-oriented control methods.

Field-oriented control is a substantial improvement over the V/f constant control method of the prior art which merely controls the voltage V and the frequency f supplied to the motor so as to hold both proportional to the speed of the motor, thereby to maintain the rotating flux constant. The main drawback of using voltage and frequency as the demand is that the dynamic control of the torque is not properly achieved because there is not a workable relationship between the torque as a variable and the voltage and frequency as the inputs.

In contrast thereto, field-oriented control methods do not call for voltage and frequency as control parameters. They are based on a reference frame which rotates at the speed of the rotor flux vector and upon which reference frame are oriented a flux component and a torque component of the stator currents which control the rotor flux and the resulting torque. These are coincident one with the d-axis, over the other with the q-axis. Typical of this approach is the control method shown in IFAC Symposium on Control in Power Electronics and Electrical Drives, Lausanne, Switzerland 1983, Pergamon Press, Oxford 1984: "Control of AC-Modules With The Help of Microelectronics," by W. Leonhard, pp 35-38. However, torque control in this prior art has been performed with current feedback control approach.

The present invention rests upon the idea with a field-oriented control method of no longer using current sensing as a current feedback control approach.

SUMMARY OF THE INVENTION

The present invention resides in an induction motor drive control system including a controlled AC voltage power supply for passing AC current through the motor, the supply voltage being controlled as a function of the motor torque demand and of the motor shaft angular position.

More specifically, the supply voltage is controlled in accordance with a derived rotation angle demand $\theta^*$ and in relation with a direct voltage component $v_{ds}$ and a quadrature voltage component $v_{qs}$, where $$v_{ds} = 1 - (\omega_m + \omega_s)\omega_s T_1 T_2 \sigma \text{ and}$$

$$v_{qs} = (\omega_m + \omega_s)T_1 + \omega_s T_2 + T_1 T_2 \sigma \cdot d\omega_s/dt$$

with:

$\omega$ = electrical angular velocity of the reference frame
$\omega_m$ = electrical angular velocity of motor shaft
$R_1$ = stator resistance per phase
$R_2$ = rotor resistance per phase
$L_1$ = three-phase stator self-inductance
$L_2$ = three-phase rotor self-inductance
$M$ = three-phase stator/rotor mutual inductance
$\omega_s$ = slip frequency = $(\omega - \omega_m)$
$\sigma = (1 - M^2/L_1 L_2)$
$T_2 = L_2/R_{20}$; $T_1 = L_1/R_1$
$n$ = pole pair number of machine, and where:
$\theta^* = \int(\omega_m + \omega_s)dt$

DESCRIPTION OF THE PREFERRED EMBODIMENT

Figure 1:
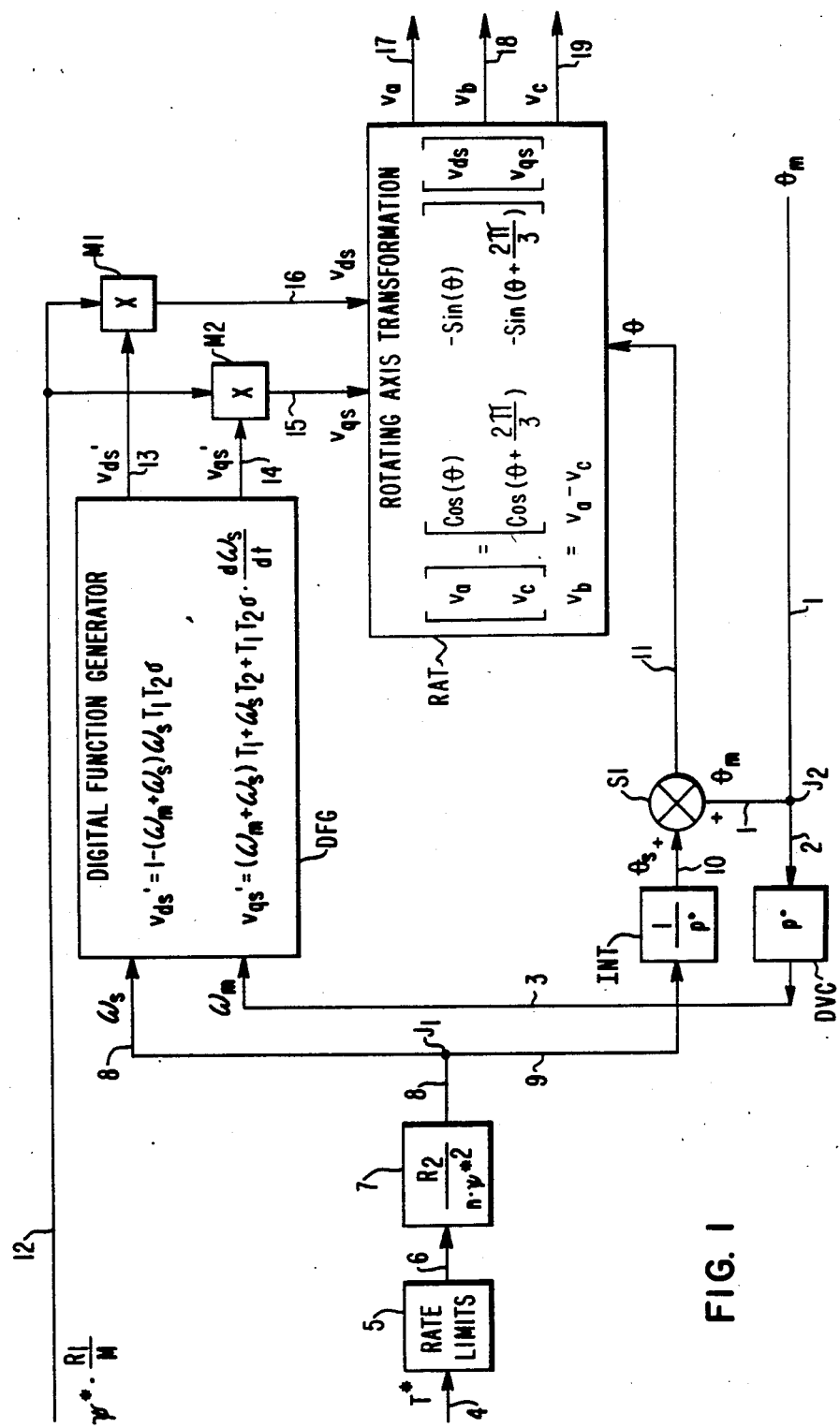
FIG. 1 is a schematic representation of the control system according to the invention.

The prior art is replete today with computer-based control of an induction-motor using information derived from the terminal currents to the motor. See for instance IFAC Symposium on Control in Power Electronics and Electrical Drives, Lausaunne, Switzerland 1983, Pergamon Press, Oxford 1984:

"Current Inverter in the Sliding Mode for Induction Motor Control" by F. Bilalovic, A. Salanovic, pp. 139-144;

"Field-Oriented Control by Forced Rotor Currents in a Votlage-Fed Inverter Drive" by J. Holtz and S. Stadtfeld, pp. 103-110; and "Control of AC-Machines with the Help of Microelectronics" by W. Leonhard, pp. 35-58.

For the purpose of this disclosure, these articles published by Pergamon Press, Oxford 1984 are hereby incorporated by reference.

The induction motor operating conditions are represented by a set of equations which can be expressed as follows:

$$\begin{bmatrix} v'_{ds} \\ v'_{qs} \\ 0 \\ 0 \end{bmatrix} = \begin{bmatrix} (R_1 + L_1\sigma p.) & (-\omega L_1 \sigma) & (M/L_2 \cdot p.) & (-\omega M/L_2) \\ (\omega L_1 \sigma) & (R_1 + L_1\sigma p.) & (\omega M/L_2) & (M/L_2 \cdot p.) \\ (-M/T_2) & (0) & (1/T_2 + p.) & (\omega_m - \omega) \\ (0) & (-M/T_2) & (\omega - \omega_m) & (q/T_2 + p.) \end{bmatrix} \begin{bmatrix} i'_{ds} \\ i'_{qs} \\ \psi'_{dm} \\ \psi'_{qm} \end{bmatrix} \quad (1)$$

where $v'_{ds}$ and $v'_{qs}$ are the stator voltage direct and quadrature components; $i'_{ds}$ and $i'_{qs}$ the stator current direct and quadrature components; $\psi'_{dm}$ and $\psi'_{qm}$ the rotor flux vector direct and quadrature components, where:

$\omega$ = electrical angular velocity of reference frame
$\omega_m$ = electrical angular velocity of motor shaft
$v'_{ds}$, $v'_{qs}$ = d,q-axis components of stator voltage
$i'_{ds}$, $i'_{qs}$ = d,q-axis components of stator current
$\psi'_{dm}$, $\psi'_{qm}$ = d,q-axis components of rotor flux vector
$R_1$ = stator resistance per phase
$R_2$ = rotor resistance per phase $L_1$ = three-phase stator self-inductance
$L_2$ = three-phase rotor self-inductance
$M$ = three-phase stator/rotor mutual inductance
$\sigma = (1 - M^2/L_1 L_2)$
$T_2 = L_2/R_2$, $T_1 = L_1 R_1$
$p \cdot = d/dt$; and where the symbol * indicates "reference value".

Besides matrix (1), there is the expression of the torque T:

$$\text{Torque} = Mn/L_2 [\psi_{dm} \cdot i'_{qs} - \psi_{qm} i'_{ds}]$$

where:

n = pole pair number of machine

The voltage ($v'_{ds}$, $v'_{qs}$), current ($i'_{ds}$, $i'_{qs}$) and flux ($\psi'_{dm}$, $\psi'_{qm}$) components in equation (1) are defined in a reference frame which rotates at the speed $\omega$ relative to the stator of the machine and at speed $\omega_s = (\omega - \omega_m)$ relative to the rotor of the machine.

The basic principle of field-oriented control resides in choosing the speed $\omega$ so that the d-axis of the reference frame, by definition, always coincides with $\psi$ which, therefore, becomes $\psi_{dm}$, i.e. the resultant rotor flux vector.

As a result of this constraint, the value of $\psi_{qm}$, the quadrature component, is always equal to zero.

The matrix of equations (1) becomes accordingly $$\begin{bmatrix} v_{ds} \\ v_{qs} \\ 0 \\ 0 \end{bmatrix} = \begin{bmatrix} (R_1 + L_1 \sigma p.) & (-\omega L_1 \sigma) & (M/L_2 \cdot p.) \\ (\omega L_1 \sigma) & (R_1 + L_1 \sigma p.) & (\omega M/L_2) \\ (-M/T_2) & (0) & (1/T_2 + p.) \\ (0) & (-M/T_2) & (\omega - \omega_m) \end{bmatrix} \begin{bmatrix} i_{ds} \\ i_{qs} \\ \psi_{dm} \end{bmatrix} \quad (2)$$

From the last row in matrix (2), the following equation is derived $$(\omega - \omega_m) = \frac{M}{T_2} \cdot \frac{i_{qs}}{\psi_{dm}} \quad (3)$$

From the third row in matrix (2) the following equation obtains:

$$\left( \frac{1}{T_2} + p. \right) \psi_{dm} = \frac{M}{T_2} \cdot i_{ds} \quad (4)$$

Equation (4) indicates that the rotor flux $\psi_{dm}$ is governed entirely by the variable $i_{ds}$, namely the d-axis component of the stator current. For a constant rotor flux $p \cdot \psi_{dm}$ is zero. Therefore, $\psi^* = \psi_{dm} = M i_{ds}$, from which it follows that $i_{ds}$, the direct current component in the reference frame, is a constant.

From equation (4), since $\psi_{qm} = 0$ in the torque expression $$T = (M_x n)/L_2 [\psi_{dm} \cdot i_{qs} - \psi_{qm} \cdot i_{ds}]$$

T becomes: $T = (M \times n)/L_2 \times \psi_{dm} \times i_{qs}$ (5)

It appears from equation (5) that the torque is directly proportional to the value of $i_{qs}$, the quadrature component of the stator current in the reference frame. The proportionality constant depends upon the level of rotor flux established under the effect of $i_{ds}$.

Still under the field-oriented control principle, the following practical propositions apply:

a. measurement is used to determine the rotor flux vector, and such determination is used continuously in order to define the reference frame angle $\omega$;

b. within such reference frame, the d- and q-axis components of the current ($i_{ds}$, $i_{qs}$) in the stator are measured and controlled in relation to the flux and torque requirements, one according to equation (4) the other according to equation (5).

A further step, according to some control schemes, consists in taking advantage of the fact that, with equations (3), (4) and (5), there is enough information to control the motor without actually measuring the rotor flux.

To this effect a torque demand T* and flux demand $\psi^*$ are specified. Then, from equation (5) $i_{qs}^*$ is derived, namely $$i_{qs}^* = L_2/M_n \times T^*/\psi^*, \quad (6)$$

and from equation (4) $i_{ds}^*$ is known:

$$i_{ds}^* = 1/M (1 + p \cdot T_2) \psi^*. \quad (7)$$

Finally, equation (3) gives:

$$\omega^* = \omega_m + M/T_2 i_{qs}^*/\psi^* \quad (8)$$

Equations (6), (7) and (8) fully determine the instantaneous values of the stator currents required to be supplied to the motor in order to control the torque and the flux, so as to assure the desired values T* and $\psi^*$. The preceding is prior art, a method of control widely used and well understood. A practical implementation consists in developing closed loop control using an inverter as the power amplifier which will immediately inject, under the control signals, correct current values into the stator windings.

An important requirement for rotating electrical drives is the ability to control the torque produced by the electrical machine. Provided this can be done with a satisfactory dynamic response, speed and position control systems can be designed, usually, without difficulty. The induction motor, however, is more difficult to control because of the complex relationship existing between the torque and the terminal electrical quantities. There has been a number of schemes disclosed in the prior art which allow to determine the required stator currents which, when impressed on the machine, will generate an effective torque proportional to the control signal. As hereabove stated, these schemes will use negative feedback current control loops which are closed around voltage controlled power sources. It may not be desirable, or even practical, to perform closed loop current control.

In contrast to the prior art control schemes, the present invention proposes a system wherein the voltage supplied to the induction motor can be determined directly, i.e. without having to measure the terminal currents to the motor, while still preserving the proportionality, dynamically, between the control signal and the generated torque.

The present invention is based on the observation that aforestated equations (3), (4) and (5) not only fully define how much stator current is necessary to obtain the correct torque and the correct flux, but also, in the light of the matrix equations (1) and (2), they define the terminal voltages which should be applied to the machine in order to generate the very same stator current.

At first sight, the expressions of voltage to be derived from matrix (1), or (2), will be quite complex. However, it is observed according to the present invention, that the formulae becomes much more simple when choosing specifically a constant rotor flux condition. With this condition $\psi_{dm}$ and $i_{ds}$ become constants which can be given the values $$\psi_{dm} = \psi^* \qquad (9)$$

and $$i_{ds} = \psi^*/M. \qquad (10)$$

Accordingly, equation (3) and equation (5) may be compared so as to derive $\omega$ and $i_{qs}$ as follows:

$$\omega = \omega_m + M/T_2 i_{qs}/\psi^*$$

$$i_{qs} = L_2/M_n \times T^*/\psi^*.$$

These values can be substituted in the first two rows of matrix (2), to derive the following voltage component values:

$$v_{ds} = \frac{R_1 \psi^*}{M} \cdot (1 - (\omega_m + \omega_s)\omega_s T_1 T_2 \sigma) \qquad (11)$$

$$v_{qs} = \frac{R_1 \psi^*}{M} \cdot \left( (\omega_m + \omega_s)T_1 + \omega_s T_2 + T_1 T_2 \sigma \frac{d\omega_s}{dt} \right) \qquad (12)$$

where $$\omega_s = \omega - \omega_m \qquad (13)$$

$$= \frac{M}{T_2} \cdot \frac{L_2}{M_n} \cdot \frac{T^*}{(\psi^*)^2}$$

$$= \frac{R_2}{n} \cdot \frac{T^*}{(\psi^*)^2}$$

It appears that, when implementing voltage control with direct and quadrature components as defined by equations (11) and (12), the slip frequency is defined therein as proportional to the torque demand Therefore, the torque will follow the reference T* exactly as in the case of the prior art field-oriented methods, however, without in this case any need for separate means of current control.

Thus, equations (11) and (12) define the terminal voltage of the induction motor. If the motor is supplied with a voltage-controlled power supply, the voltage control signals according to the equations will be proportional to torque and, therefore, allow the machine a torque matching the torque demand $\psi^*$. Equation (12) contains a derivative term $d\omega_s/dt$ which is directly related to the torque demand T*. Therefore, a limit will be applied to the rate of change of the torque demand in order to avoid reaching an excessive voltage demand. In principle, such limit would be made variable and depending upon the margin of voltage control available at any operating point, for a given prevailing flux level. In practice, this limit is given a constant value which is suitable for the entire operating range. Moreover, such limit is valid both for the positive and negative excursions of the torque demand. it is observed, that such limited rate torque demand is a requirement for a current controlled system, as well.

Referring to FIG. 1, an implementation of a control system according to the invention is illustratively shown. The feedback signal $\theta_m$ representing the motor shaft position is derived on line 1. This can be done directly, or indirectly, in order to determine shaft speed. A derivative circuit DVC receives, on line 2 after junction J2, the signal of line 1 to provide, on line 3, the actual frequency signal $\omega_m$ of the shaft. The torque demand signal T*, on line 4, is passed through a rate limiter 5 which is applicable to positive and negative excursions. The outputted signal, on line 6, is passed through a scaling circuit 7 defined by a constant $R_2/n \psi^{*2}$ as defined by equation (13), thereby to provide on line 8 at junction J1 a command signal representing the slip frequency $\omega_s$. By integration in integrator circuit INT, the signal of line 9 from junction J becomes on line 10 the angular displacement $\theta_s$ due to the slip frequency $\omega_s$. Summer S1 adds $\theta_m$ of line 1 and $\theta_s$ of line 10 to provide on line 11 the angular displacement $\theta$ of the rotating shaft required to match the torque demand T*. $\theta$ represents the instantaneous angular position of the reference frame in the induction motor, i.e. the electric angle on the voltage input of the induction motor.

Using $\omega_s$ of line 8 and $\omega_m$ of line 3, a digital function generator DFG calculates in accordance with equations (11) and (12) the torque demand related direct and quadrature voltage components $v'_{ds}$, $v'_{qs}$ in the reference frame rotating according to angle $\theta$ of line 11. These two components are scaled in accordance with the rotor flux amplitude demand $\psi^* R/M$ applied on line 12, which is a constant as stated hereabove. Thus, $v'_{ds}$ outputted on line 13 from circuit DFG is scaled by multiplier M1, and $v'_{qs}$ outputted on line 14 is scaled by multiplier M2. The respective scaled components $v_{ds}$ and $v_{qs}$ appear on lines 16 and 15.

Transformation from a rotating reference wave at angle $\theta$ as on line 11, to coordinate axes fixed relative to the winding of the machine is effected by a rotating axis transformation circuit RAT in accordance with the following relationships:

$$\begin{bmatrix} v_a \\ v_c \end{bmatrix} = \begin{bmatrix} \cos(\theta) & -\sin(\theta) \\ \cos\left(\theta + \frac{2\pi}{3}\right) & -\sin\left(\theta + \frac{2\pi}{3}\right) \end{bmatrix} \begin{bmatrix} v_{ds} \\ v_{qs} \end{bmatrix}$$

The third voltage $v_b$ is derived from the two other voltages $v_a$, $v_c$ since they belong to a symmetrical three-phase system as follows:

$$v_b = -v_a - v_c.$$

This is also performed within circuit RAT.

The three voltage control signals $v_a$, $v_b$, $v_c$ so derived appear on lines 17, 18, 19.

Figure 2:
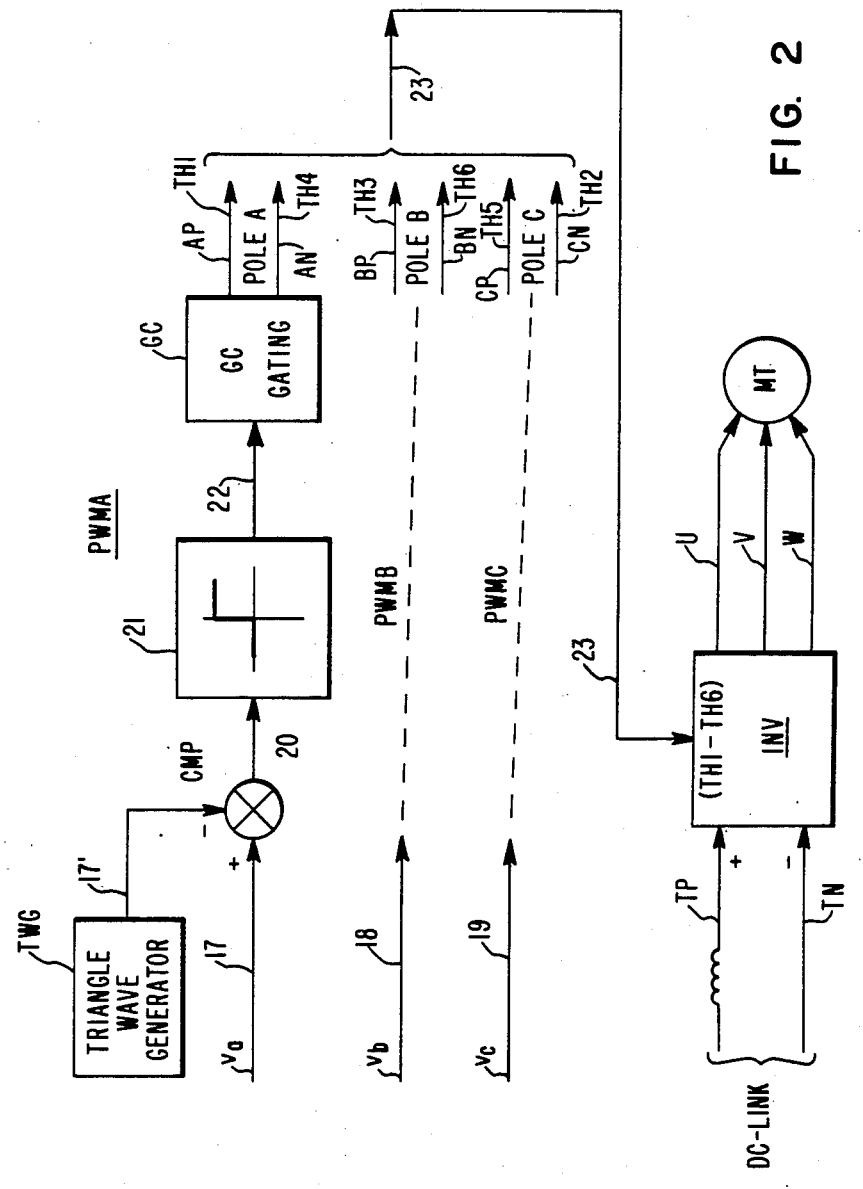
FIG. 2 is a block diagram illustrating voltage control of a voltage-fed inverter supplied motor drive by pulse-width-modulation (PWM), in accordance with the control signals generated as shown in FIG. 1.

Control of an induction motor with the control signals of lines 17, 18, 19 is illustrated in FIG. 2 implemented as a pulse-width-modulation (PWM) control of the inverter INV coupled between a voltage DC link having terminals TP and TN and three AC phases U,V,W feeding the motor MT in an AC motor drive. The inverter has three poles A, B, C including thyristors (TH1, TH4) (TH3, TH6) and (TH5, TH2) associated by pairs for the respective poles between the opposite polarity terminals TA, TB. Considering pole A, control voltage $v_a$ is applied as reference wave to a comparator CMP which is responsive from line 17' to a triangular wave signal derived from a triangular wave generator TWG. The pulse-width modulated signal appears on line 22 as derived from the output line 20 of analog comparator CMP then passing through a digital comparator 21. The gating circuit GC for thyristor (TH$_1$ or TH$_4$) of pole A is controlled by the pulse-width modulated signal of line 22. As a result, by lines AP or AN the opposite thyristors (TH$_1$ or TH$_4$) are controlled for conduction in accordance with the sine wave reference v$_a$ of line 17, which results in the generation for phase U of a voltage waveform which is defined by the reference wave v$_a$. This is a generally known method. The same can be said for the 120° phase shifted signal v$_b$ and the voltage supply of phase V, as well as for the third phase W under control signal v$_c$ which is also at 120° phase shift there behind.

Figure 3:
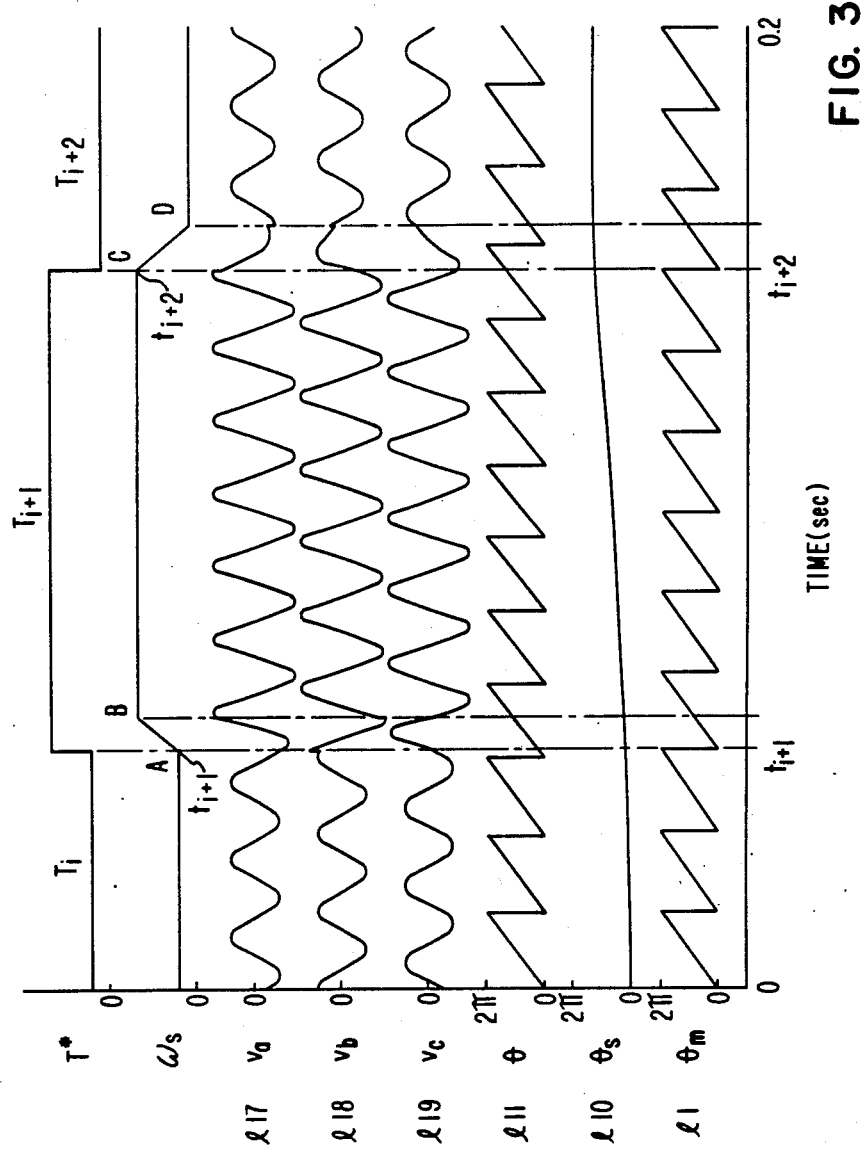
FIG. 3 illustrates with curves the operation of the system of FIG. 1 for three successive different levels of the torque demand.

FIG. 3 illustrates with curves the operation of the circuit of FIG. 1. The first curve, there shown, is T*, assuming successively at, a limit rate (AB, CD), a higher level T$_{i+1}$ above T$_i$ initially, then, a lower level T$_{i+2}$ below T$_i$ and T$_{i+1}$. The last curve is the sensed motor shaft position signal $\theta_m$ recurring at a constant rate as a function of time between 0 and $2\pi$ radians. The slip frequency signal of line 9 after integration provides the signal $\theta_s$ of line 10 which varies slowly with time. $(\theta_m+\theta_s)=\theta$ appears, as on line 11, with a higher frequency signal between instant t$_{i+1}$ and t$_{i+2}$, and then with a frequency which is lower than before instant t$_{i+1}$ after instant t$_{i+2}$.

The resulting voltages v$_a$, v$_b$, v$_c$ appear as outputted by circuit RAT on lines 17, 18, 19. It is observed that, while varying in frequency as just stated, these signals vary both in amplitude and in phase, as shown for us at times after AB, and after CD.

The control method and system according to the present invention, it is observed, uses only shaft position feedback, while still providing a dynamic torque response proportional to the reference signal T* of line 4. It is an open loop approach based on prior knowledge of the motor parameters which, as in any "observer" method, is as good as the used characteristics and constants. It is an open loop in the spirit of the vector control methods of the prior art. The control system is here capable of defining the instantaneous voltages which should be supplied to a three-phase induction motor in order to satisfy a torque demand under both static and dynamic conditions.

I claim:

1. In an induction motor drive control system associated with an AC power supply applying to the induction motor a controlled AC voltage power supply as a function of a motor torque demand;
   the combination of:
   first means for providing a motor shaft position representative signal;
   second means responsive to a predetermined torque demand signal for providing a slip frequency representative signal;
   third means responsive to said first and second means for providing a reference frame rotation angle representative signal for said motor;
   means responsive to said motor shaft position representative signal and to said slip frequency representative signal for providing a direct and a quadrature voltage signal defined by reference to said reference frame;
   means responsive to said reference frame rotation angle representative signal and to said direct and quadrature voltage signals for generating AC voltage representative signals for said AC power supply;
   with said direct and quadrature voltage signals providing means providing a direct voltage signal v$_{ds}$, where:
   $$v_{ds}=1-(\omega_m+\omega_s)\omega_s T_1 T_2 \sigma$$
   and a quadrature voltage signal v$_{qs}$, where:
   $$v_{qs}=(\omega_m+\omega_s)T_1+\omega_s T_2+T_1 T_2 \sigma d\omega_s/dt;$$
   and where:
   $\omega$=electrical angular velocity of the reference frame;
   $\omega_m$=electrical angular velocity of motor shaft;
   R$_1$=stator resistance per phase;
   R$_2$=rotor resistance per phase;
   L$_1$=three-phase stator self-inductance;
   L$_2$=three-phase rotor self-inductance;
   M=three-phase stator/rotor mutual inductance;
   $\omega_s$=slip frequency;
   $\sigma=(1-M^2/L_1 L_2)$;
   T$_2$=L$_2$/R$_2$;
   T$_1$=L$_1$/R$_1$;
   n=pole pair number of the machine; and
   p·=d/dt;
   with means for imposing a maximum on the rate of change of said predetermined torque demand signal being interposed between said predetermined torue demand signal and said second means;
   with said AC voltage power supply being controlled by said AC voltage representative signals, thereby to dynamically generate a torque proportional to said predetermined torque demand signal when said predetermined torque demand signal changing, while not exceeding said maximum rate of change.

2. The control system of claim 1 with said AC voltage representative signal rotation angle representative signal generating means being also responsive to a rotor flux amplitude demand signal equal to $\psi^* R_1/M$.

3. The control system of claim 2 with said second means providing a slip frequency representative signal in accordance with the formula
$$\omega_s=(R_2/n\psi^{*2})\cdot T^*$$
where, $\psi^*$ is a rotor flux predetermined value, and T* is the torque demand.

4. The control system of claim 3 with the direct component of the rotor flux being $\psi_{dm}=\psi^*$, and with the quadrature component of the rotor flux being $\psi_{qm}=0$.

* * * * *